May 16, 1967 C. F. GORMAN 3,320,430
PHOTOSENSITIVE INFORMATION BEARING DOCUMENT DETECTOR
Filed Sept. 25, 1964
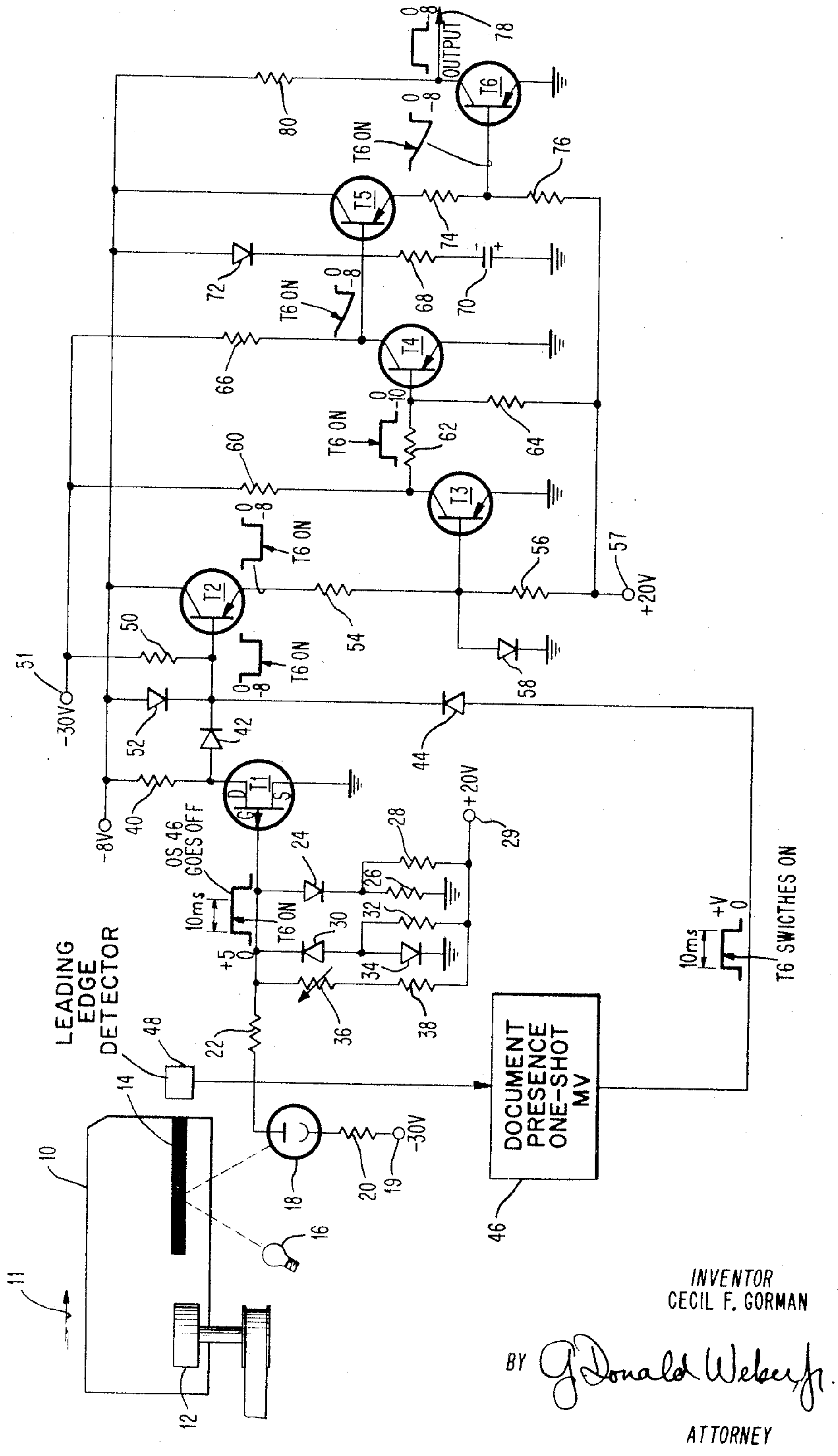
INVENTOR
CECIL F. GORMAN
BY G. Donald Weber Jr.
ATTORNEY United States Patent Office 3,320,430
Patented May 16, 1967

3,320,430
PHOTOSENSITIVE INFORMATION BEARING DOCUMENT DETECTOR

Cecil F. Gorman, Norristown, Pa., assignor to Sperry Rand Corporation, New York, N.Y., a corporation of Delaware Filed Sept. 25, 1964, Ser. No. 399,219
10 Claims. (Cl. 250—219)

This invention relates to a document detector and more specifically to a circuit for detecting the passage of certain documents in a high speed document processing system, which documents may be control information bearing documents.

Due to the tremendous volume of business documents that are generated daily as a result of commercial transactions, the high speed automatic handling of these documents has become highly favored. For example, in the banking industry billions of documents, such as bank checks and deposit slips, are generated each year which must be posted to the customer's account at each of the individual institutions. It has become almost standard procedure that the usual bank check contain along its lower edge a group or groups of digits and symbols which function, in automatic processing, to direct the document along its proper route, after these symbols and characters are read and interpreted by a document processing system.

It is quite common for a bank check to contain at least three groups of coded information along its lower edge. The first group of digits may identify a particular bank. A second group of digits may identify a particular customer's account in the bank indicated by the first group of digits. The third group of digits may contain the information regarding, or indicative of, the amount for which the particular check was drawn. It will be understood that additional fields or groups of digits are known and quite often utilized.

In the typical banking institution, a high speed document processor would be utilized to sort the documents into respective output pockets to facilitate posting of these checks to the individual customers' accounts. The sorting operation would usually take place after a large group of documents have been accumulated. The documents would be placed in the input hopper and after the document processing system has commenced operation, the documents would be advanced seriatim past document presence detectors and the magnetic ink character recognition reading head. The signal induced in the reading head by the magnetically encoded characters would be translated into a pocket assignment for the document. The sorting of documents may be accomplished in an "on-line" procedure which operates in conjunction with a data processing system, or, the sorter itself may assign the pockets and thus operate in a less sophisticated mode than in the "on-line" manner.

Different groups of documents may be sorted according to different routines. If a high speed document sorting system is to take advantage of its high processing rates, then the signals and routines which are peculiar to a particular group of documents must be delivered to the system in the most efficient manner. It has been found that control documents containing control information may be intermixed with the documents to thereby change or alter the sorting routine for each group of documents. For example, it may be desirable to sort a first group of documents into only the first ten pockets of the document sorter. Then, it may be desirable to sort a second group of documents into, a different number of pockets, for example, eighteen pockets. Heretofore, the system would be instructed to sort the first group of documents into the ten pockets and after this sorting procedure has been accomplished, the system would be instructed by means of punched cards, tapes, or the like, to sort the second group of documents into the eighteen pockets. However, the instant invention contemplates that the first group of documents would be preceded by one or more control documents which would contain information necessary for the sorting of the first group of documents. These control documents would be substantially identical to the documents being sorted and would be handled in a manner similar to the documents to be sorted. However, means are employed to detect these control documents and cause the system to act accordingly. Between the first group of documents and the second group of documents, selected control documents (or documents bearing control information) would be inserted so that upon the sorting of the last document of the first group, the next document would be a control document which would immediately signal the system that the second group is about to be sorted. This particular invention relates to a circuit for detecting the control documents. The detection of a control document may also be employed to perform many other functions such as a stop feed instruction, an instruction to actuate various indicators, or the like.

One type of control document which has been utilized in a system which has been constructed and successfully operated in accordance with the principles of this invention, carries a black continuous strip of predetermined dimensions. In addition to the black strip, this document may contain various other control information which is normally read and interpreted by the magnetic ink character recognition reading head. Associated with the problem of detecting a control document, is the problem of distinguishing between true control documents and those documents which may contain a black or inked area similar to the control document. Such documents or checks may be impressed with a dark strip as a result of being produced by a check writer or other similar means. In addition, blotches of ink or stamps upon a document may cause an erroneous indication that a control document was detected. The circuit of the present invention will respond only to true control documents which bear the predetermined indicia.

Accordingly, it is the principal object of this invention to improve selected document detectors.

It is a further object of this invention to improve selected document detectors utilized in control operations for document processing systems.

It is a still further object of this invention to provide a circuit for detecting the presence of a control document in a high speed document processing system.

In the present invention, means are employed to serially advance documents past a first detecting station which signals that the leading edge of a document has been engaged, and past a second detecting station which may be or employ a photoelectric device to detect the characteristic indicia of the document. In the present invention, the characteristic indicia may be a black strip of predetermined dimensions. However, it will be understood that various other characteristic indicia may be employed in a satisfactory manner. The output from the photoelectric device is directed to a field effect transistor whose output is coupled to one input of an AND circuit. The other input to the AND circuit is from the detector which detects the leading edge of a document and triggers a document presence one-shot multivibrator for a predetermined period of time. The output from the AND gate is directed to a series of amplifiers which control the charge on a capacitor. The circuitry is such that the capacitor charges slowly but is capable of very fast discharge. Functioning in this embodiment, the capacitor will charge as the black strip progresses past the document detecting device. If the black strip is of sufficient duration, then the capacitor will charge to a value sufficiently large to initiate an output stage to produce a signal indicating that the characteristic indicia on a control document has been detected. As soon as the block strip has passed the detecting means, then the capacitor will be immediately discharged. This circuitry requirement is brought about due to the fact that a series of black spots or areas less than that required for the characteristic indicia may appear on the document and the capacitor could be additively built up to a level which would trigger the output stage, thus, erroneously indicating the passage of the characteristic indicia on a control document. However, in the present circuit, the capacitor would be discharged immediately between spots thus preventing any additive build-up on the capacitor and preventing the generation of a false output signal. The output signal may be utilized to control a solenoid that inhibits the feeding of documents, may signal the system that a second set of procedures must be instituted, may turn off the system, may delete or add sorting instructions, or any one of many other functions.

The invention is illustrated by a single figure which is an electrical schematic diagram of the circuitry for accomplishing the detection of the characteristic indicia on a control document. The waveforms at various points in the circuit are included in the figure.

With reference to the figure, a document 10 is advanced by an an advancing means 12 in the direction indicated by arrow 11. The document 10 bears a dark strip 14, as shown. A source of illumination 16 is positioned to illuminate document 10, especially in the area of the dark strip or stripe 14. The illumination reflected from the document is sensed by a photoelectric device 18. In the case of reflection from a light surface, either from the document or its background supporting means, photoelectric means 18 will conduct a larger current than when the source of illumination 16 is directed to a black or dark area such as strip 14. This phenomenon occurs because strip 14 is designed so that it absorbs substantially all of the illumination from source 16.

A voltage source 19, which supplies −30 volts, for example, is coupled to the photoelectric device 18 through a resistor 20. In addition, the photoelectric means 18 is coupled to the base electrode of a field effect transistor T1 through a resistor 22. The field effect transistor T1 is a device which utilizes two ohmic contacts and one PN junction. A transistor of this type will operate with very small currents and possesses good temperature stability, which is most desirable. In the field effect transistor, the germanium section that completely circumvents the central germanium section of opposite polarity, is called the "gate" and identified on the drawing as G. One of the ohmic contacts is known as the "source" and identified as S while the other ohmic contact is known as the "drain" and identified by D.

An interesting feature of the field effect transistor is that essentially only one type of carrier (electrons) is involved. This is in sharp distinction to the conventional transistor where two types of carriers play a role. This operation results in a significantly different manner of achieving amplification. In the conventional triode transistor, the carriers must travel from the emitter through the base to the collector. This makes carrier transit time an important factor in determining frequency response. In the field effect transistor, such as used in the present invention, the signal at gate G serves to modulate the drain current and in this way produce the signal variations in the drain output circuit. Carriers do not have to transport the signal from the gate to the drain; hence, carrier transit time is not involved. In addition, transit time from source to drain is unimportant, since the signal voltage at the gate G merely expands or contracts the current stream. It does not alter its rate of travel.

With reference to the figure, a diode 24 poled in the manner shown has the anode thereof connected to gate G of transistor T1. The cathode of diode 24 is connected to a pair of resistors 26 and 28. Another terminal of the resistor 26 is connected to a suitable reference potential, for example ground. Another terminal of resistor 28 is connected to a positive voltage source 29 such as the +20 volt supply shown. The cathode of diode 30 is also connected to the gate electrode of T1 while its anode is connected through a resistor 32 to source 29. In addition, the anode of the diode 30 is connected to the anode of diode 34 whose cathode is connected to a suitable reference potential, for example ground. The gate electrode of T1 is also connected to source 29 through variable resistor 36 and fixed resistor 38, the resistors 36 and 38 being in series relationship. With the arrangement of the resistors, diodes and the voltage supplies as shown, the input to the gate electrode of T1 is limited to between approximately zero and five volts positive with respect to ground, since the diodes 24 and 30 function as clamps to limit the voltage swings between these values. The variable resistor 36 provides a means for adjusting the parameter that controls the transistor T1.

The source electrode S of T1 is coupled to a suitable reference potential, for example ground, while the drain electrode D of T1 is connected to a negative voltage source 39, which may supply −8 volts, through a resistor 40. The output taken from the drain electrode of T1 is connected to the anode of a diode 42 which diode forms a portion of an AND circuit. The other portion of the AND circuit includes a diode 44 which is coupled to receive the output from a document presence one-shot multivibrator 46. Any suitable detector 48 is positioned along the document path to detect the passage of the leading edge of a document 10 and supply a signal to document presence one-shot multivibrator 46. The one-shot multivibrator 46 then supplies an output signal of predetermined amplitude and duration to the anode of diode 44.

The cathodes of the diodes 42 and 44 are coupled to the base of a PNP transistor T2. In addition, source 51 which supplies potential, for example −30 volts, is connected to the base of transistor T2 through resistor 50. Also, diode 52 has its cathode connected to the base of T2 and its anode coupled to source 39. Diode 52 functions as a protective device by effectively clamping the base of transistor T2 to a maximum negative potential of −8 volts. Without diode 52 the circuit would draw current through diodes 42 and 44, and the base of T2 would go more negative than −8 v.

As previously set forth, the base of transistor T2 is coupled to the diodes 42, 44 and 52 and a resistor 50. The collector of transistor T2 is connected directly to the negative source 39, as shown. The emitter of transistor T2 is connected to positive source 57 which supplies, for example +20 volts through series resistors 54 and 56. The transistor T2 is thus arranged in an emitter-follower configuration. An amplifying transistor T3 has its base connection at the common point between the resistors 54 and 56. Also connected to the base of the transistor T3 and the common point of the resistors 54 and 56 is the anode of diode 58 whose cathode is connected to a suitable reference potential, for example, ground. Diode 58 is poled so that the base transistor T3 never rises above substantially zero volts. The emitter of the transistor T3 is connected directly to a suitable reference potential, for example ground while its collector is coupled through resistor 60 to negative potential source 51.

Another amplifying stage comprising transistor T4 follows the amplifying stage T3. The base of transistor T4 is coupled to the collector of transistor T3 through a resistor 62. In addition, the base of the transistor T4 is connected to source 57 through resistor 64. The emitter of transistor T4 is coupled to a suitable reference potential, for example, ground, while the collector is connected to negative potential source 51 through resistor 56.

Transistor stage T5 follows amplifying state T4. The base of the transistor T5 is coupled directly to the collector of the transistor T4. In addition, a series-coupled current limiting resistor 68 and a capacitor 70 are connected to the base of the transistor T5 with the positive terminal of the capacitor 70 being connected to a suitable reference potential, for example, ground, as shown. The resistor 68 limits the peak current discharged through the transistor T4 at the end of the one-shot 46 period or dark areas on the document. A diode 72 has its cathode coupled to the base of transistor T5 while its anode is connected to negative potential source 39. Diode 72 functions to clamp the voltage at the base of the transistor T5 to −8 volts or above, thereby allowing capacitor 70 to charge toward −30 volts instead of −8 volts. This operation provides a greater $\Delta V/\Delta t$ and, thus, more accurate timing. In addition, transistor breakdown is prevented. The operating condition of transistor T4 controls the charging of capacitor 70. When there is no black stripe or area being detected by the detecting means 18 (i.e., there is reflected light), then transistor T4 (as well as transistor T5) is conducting which prevents the accumulation of charge on capacitor 70. When a black or dark area on a document 10 is being sensed (no reflected light), the transistor T4 is driven off which permits capacitor 70 to charge. If the black area being sensed on the document 10 is of the characteristic indicia, i.e., of sufficient length, then the transistor T4 will remain off and when the charge on the capacitor has reached a level of approximately −5½ volts to −7½ volts, the output circuitry will conduct to produce an output pulse. The output circuitry just referred to will be described at this time.

The transistor T5 has its collector connected directly to negative source 39 while its emitter is connected to positive source 57 through series connected resistors 74 and 76. The output stage comprises transistor T6 which has its base connected to the common point of the resistors 74 and 76 while its emitter is connected directly to ground or other suitable reference potential. The output from transistor T6 is taken from its collector indicated at the output terminal 78. The collector of transistor T6 is connected to the negative source 39 through resistor 80. The output at terminal 78 is a signal approximately as shown which rises from −8 volts to approximately zero volts and, after a predetermined time dependent upon the circuit parameters, returns to −8 volts, at which time transistor T6 goes low or off.

The operation of the circuit will now be described with reference to the condition when a document bearing the characteristic indicia (viz a black area of predetermined dimensions) is not present before the detecting means. Typical waveforms are shown adjacent corresponding circuit points. The point at which the output stage T6 switches on is also shown on each waveform. Under the conditions of no indicia, there would be reflected light since no dark area is available to absorb the illumination from source 16. In this condition, the photocell 18 output to the gate terminal of transistor T1 would cause transistor T1 to be "high" or on. As a result, the required input is not available to the diode 42 so that the document not bearing the characteristic indicia is detected by the means 48 which causes document presence one-shot 46 to transmit a pulse to diode 44 such that transistor T2 remains off with its base at approximately 0 volts. In actual practice this potential is in a range of −2 volts to 0 volts. The waveforms at T2 show this condition. Since transistor T2 is off, transistor T3 is off. With transistor T3 off, the proper voltages are supplied to the signal input base of transistor stage T4 causing it to be "high" or in a state of conduction. A charge is not accumulated on capacitor 70 and transistor T5 remains off. The output stage T6 is off and a steady voltage of approximately −8 volts is present at output terminal 78.

In the alternative, when a document bearing the characteristic indicia passes before the detecting means including photocell 18, little or no light is reflected since most of the light from the illumination source 16 is absorbed by the black area. As a result, the photoelectric cell 18 produces minimum output to and, thus, causes field effect transistor T1 to go "low" or off. As shown by the waveform, the voltage to the gate electrode of T1 has risen to approximately 5 volts, thus extinguishing it. The output of the document presence one-shot 46, is normally at zero volts in the absence of the characteristic indicia on a document 10. This condition prevents an uncontrolled output by transistor T1 from initiating a false signal during time periods between the passage of documents past the detecting means, as well as during the time period from the end of the initial 10 millisecond period of the one-shot 46 to the end of a document. However, since detecting means 48 has detected the leading edge of a document and triggered the one-shot 46, the other input (at diode 44) to the AND gate, comprising diodes 42 and 44, is present so transistor T2 turns on. Transistor stage T3 also goes on, thereby driving transistor stage T4 off. Capacitor 70 is now allowed to charge through the negative supply voltage towards −30 volts. When capacitor 70 which is capable of charging slowly and discharging quickly, reaches a value approximately between −5½ volts to −7½ volts, transistor T5 will turn on and switch transistor T6 into a state of conduction which will cause the voltage at its output terminal 78 to rise to approximately zero volts. The point in time at which stage T6 goes in is indicated at each of the waveforms shown in the figure. The duration of the output signal at terminal 78 is determined by the one-shot 46. When the one-shot 46 goes off, the output signal at output terminal 78 will normally be terminated. The output signal at terminal 78 may be used to control a solenoid to prevent feeding of documents (not shown), or inhibiting reading circuits (not shown), or any number of other operations as desired. A further example for the use of the output signal at the terminal 78 may be to actuate certain circuits for reading additional control information which may be positioned upon the document bearing the characteristic indicia.

In the event that the characteristic indicia is not present upon the document but a dark or a black area is present due to smudges, stampings, or even a group of characters, an output will not be indicated at terminal 78 since capacitor 70 would not be permitted to charge to a sufficient value to cause an output signal. The circuit will respond and produce an output signal at terminal 78 only when the characteristic indicia is of a predetermined length or takes a predetermined time to pass the sensing means.

Thus, there has been described a circuit which responds to characteristic indicia positioned upon control documents to perform any number of desired functions. In the absence of the characteristic indicia or black area, the output of the photoelectric detecting means is sufficient to cause the first input stage, which is a field effect transistor, to be in its conducting or on condition. The output of the field effect transistor forms one-half of an AND circuit. When the presence of any document is detected and indicated at the other half of the AND circuit coincidentally, the succeeding transistor stages will be maintained in a condition so that a timing capacitor does not charge to a value sufficient to cause an output signal. In particular successful embodiment of the invention, the capacitor had a value of 1.2 microfarads. As soon as a document bearing the characteristic indicia appears and is detected, the field effect transistor is switched off. Similarly, the transistor controlling the charging of the timing capacitor is also turned off so that the capacitor is free to charge to a value sufficient to trigger the output stages to cause an output signal.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A selected document detector for detecting the passage of documents one or more of which may bear characteristic indicia comprising, means to advance documents, a first detecting means for producing a signal indicating the passage of the leading edge of a document, a second detecting means positioned to observe the characteristic indicia and for producing an output signal only in response to the presence of the characteristic indicia upon a document, gating means coupled to receive the outputs of both of said first and said second detecting means and for producing an output signal upon the coincident application of signals thereto, means for amplifying the output signal from said gating means, means for storing the amplified output signal, and means for detecting the condition of said means for storing for producing an output signal when said means for storing exceeds a predetermined condition.

2. A selected document detector for detecting the passage of documents one or more of which may bear characteristic indicia comprising, means to advance documents, a first detecting means for producing a signal indicating the passage of the leading edge of a document, a second detecting means positioned to observed the characteristic indicia and for producing an output signal upon the presence of the indicia upon a document, a field effect transistor responsive to the output of said second detecting means, an AND gate coupled to the output of said transistor and said first detecting means, amplifying means controlled by said AND gate, storage means, switch means coupled to said amplifying means for controlling said storage means, and means for detecting the condition of said storage means to produce an output signal when said storage means exceeds a predetermined condition, upon the passage of a document bearing the characteristic indicia past both said detecting means.

3. The combination as defined in claim 2 including means coupled to the input of said transistor for limiting the voltage swing of said second detecting means.

4. A selected document detector for detecting the passage of a document one or more of which may bear characteristic indicia comprising, means to advance documents, a first detecting means for producing a signal indicating the passage of the leading edge of a document, monostable means responsive to said first detecting means for producing an output signal for a predetermined period of time after receipt of the signal from said first detecting means, second detecting means positioned to observe the characteristic indicia on a document for producing an output signal in response to the passage thereof, a field effect transistor controlled by said second detecting means, an AND circuit coupled to receive the outputs from said transistor and said monostable means, amplifying means responsive to said AND circuit, storage means, electronic switch means coupled to said amplifying means for controlling the charge on said storage means, and means for sensing the charge on said storage means for producing an output signal indicative of the passage of a document bearing the characteristic indicia.

5. The combination as defined in claim 4 wherein said second detecting means includes a source of illumination and photo-electric pick-up means.

6. The combination as defined in claim 4 wherein said storage means is a capacitor which is charged at a rate comensurate with the time that said second detecting means observes the characteristic indicia.

7. A selected document detector for detecting the passage of a document one or more of which may bear characteristic indicia comprising means to advance documents, a first detecting means for producing a signal indicating the passage of the leading edge of a document, monostable means responsive to said first detecting means for producing an output signal for a predetermined period of time after receipt of the signal from said first detecting means, second detecting means positioned to observe the characteristic indicia on a document for producing an output signal in response to the passage thereof, a field effect transistor controlled by said second detecting means, an AND circuit coupled to receive the outputs from said transistor and said monostable means, an emitter follower coupled to said AND circuit and responsive thereto, inverting means coupled to said emitter-follower, storage means, electronic switch means coupled to said inverting means for controlling the charge on said storage means, and means for sensing the charge on said storage means for producing an output signal indicative of the passage of a document bearing the characteristic indicia.

8. A selected document detector for detecting the passage of documents one or more of which may bear characteristic indicia comprising, means to advance documents, a first detecting means for producing a signal indicating the passage of the leading edge of a document, monostable means responsive to said first detecting means for producing an output signal for a predetermined period of time after receipt of the signal from said first detecting means, second detecting means positioned to observe the characteristic indicia on a document for producing an output signal in response to the passage thereof, a field effect transistor controlled by said second detecting means, an AND circuit coupled to receive the outputs from said transistor and said monostable means, an emitter-follower coupled to said AND circuit and responsive thereto, inverting means coupled to said emitter-follower, storage means, electronic switch means coupled to said inverting means for controlling the charge on said storage means, an emitter-follower coupled to said storage means and responsive thereto for electrically following the charging of said storage means, and an amplifying output stage coupled to said last named emitter-follower for producing an output signal at a predetermined time during the charging cycle of said storage means for indicating the passage of a document bearing the characteristic indicia.

9. The combination as defined in claim 8 including clamping means coupled to said storage means for limiting the potential thereof.

10. A selected document detector for detecting the passage of a document one or more of which may bear characteristic indicia comprising, means to advance documents, a first detecting means for producing a signal indicating the passage of the leading edge of a document, monostable means responsive to said first detecting means for producing an output signal for a predetermined period of time after receipt of a signal from said first detecting means, second detecting means positioned to observe the characteristic indicia on a document for producing an output signal in response to the passage thereof, said output signal from said monostable means overlapping the period during which said second detecting means may observe the characteristic indicia on a document, a field effect transistor controlled by said second detecting means, means coupled to the input of said transistor for limiting the voltage swing of said second detecting means, an AND circuit coupled to receive the outputs from said transistor and said monostable means, an emitter-follower coupled to said AND circuit and responsive thereto, inverting means coupled to said emitter-follower, means coupled between said emitter-follower and said inverting means for limiting the voltage applied to said inverting means to negative values, a capacitor, electronic switch means coupled to said inverting means for controlling the charge on said capacitor, an emitter-follower coupled to said capacitor and responsive thereto for electrically following the charging of said capacitor, and an amplifying output stage coupled to said last named emitter-follower for producing an output signal at a predetermined time during the charging cycle of said capacitor for indicating passage of a document bearing the characteristic indicia past said first and said second detecting means.

References Cited by the Examiner

UNITED STATES PATENTS

| | | | |
|---|---|---|---|
| 2,924,380 | 2/1960 | Demer et al. | 250—219 |
| 3,076,957 | 2/1963 | Hankes et al. | 340—173 |
| 3,086,121 | 4/1963 | Cockrell | 235—61.11 |

WALTER STOLWEIN, *Primary Examiner.*